US012431088B1

(12) United States Patent
Twu et al.

(10) Patent No.: US 12,431,088 B1
(45) Date of Patent: Sep. 30, 2025

(54) PIXEL CIRCUIT OF ELECTROLUMINESCENCE DISPLAY

(71) Applicant: ULTRADISPLAY INC., Hsinchu County (TW)

(72) Inventors: Dsun-Chie Twu, Hsinchu County (TW); Ching-Chung Kan, Hsinchu County (TW); Chun-Chieh Liu, Hsinchu County (TW)

(73) Assignee: ULTRADISPLAY INC., Hsinchu (TW)

( * ) Notice: Subject to any disclaimer, the term of this patent is extended or adjusted under 35 U.S.C. 154(b) by 0 days.

(21) Appl. No.: 18/905,180

(22) Filed: Oct. 3, 2024

(30) Foreign Application Priority Data

Aug. 7, 2024 (TW) ................................ 113129595

(51) Int. Cl.
*G09G 3/3241* (2016.01)
*G09G 3/32* (2016.01)

(52) U.S. Cl.
CPC ............ *G09G 3/3241* (2013.01); *G09G 3/32* (2013.01); *G09G 2300/0842* (2013.01); *G09G 2310/0289* (2013.01); *G09G 2320/064* (2013.01)

(58) Field of Classification Search
CPC ................... G09G 3/3241; G09G 3/32; G09G 2300/0842; G09G 2310/0289; G09G 2320/064
See application file for complete search history.

(56) References Cited

U.S. PATENT DOCUMENTS

2004/0257353 A1* 12/2004 Imamura .............. G09G 3/3241 345/204
2011/0134157 A1* 6/2011 Chaji .................. G09G 3/3233 345/212
2023/0196997 A1* 6/2023 Li ........................ G09G 3/3233 345/691
2023/0206792 A1* 6/2023 Song ........................ G09G 3/00 345/212
2024/0355287 A1* 10/2024 Tanaka ................. G09G 3/3233

* cited by examiner

*Primary Examiner* — Antonio Xavier
(74) *Attorney, Agent, or Firm* — Huan-Yi Lin

(57) ABSTRACT

A pixel circuit of an electroluminescence display, comprising a level shift transistor coupled between a corresponding light emitting device and a level shift terminal, configured to limit an operation voltage drop between a level shift terminal and a first voltage line based on an enabling light emitting signal, ensuring that the operation voltage drop does not exceed a clamping level; a bias transistor, configured to operate based on a bias signal to provide a luminance current; and a display transistor, connected in series with the bias transistor between the level shift terminal and the first voltage line, configured to operate based on a display signal to modulate the luminance current to a display current providing to the corresponding light emitting device; wherein the light emitting device is coupled between the level shift transistor and the second voltage line, and the first voltage line is different from the second voltage line.

14 Claims, 12 Drawing Sheets

PIXEL CIRCUIT OF ELECTROLUMINESCENCE DISPLAY

CROSS REFERENCE

The present invention claims priority to TW 113129595 filed on Aug. 7, 2024.

BACKGROUND OF THE INVENTION

Field of Invention

The present invention relates to a pixel circuit of an electroluminescence display, particularly to a pixel circuit wherein a level shift transistor limits an operation voltage drop between a level shift terminal and a first voltage line, ensuring that the operation voltage drop does not exceed a clamping level.

Description of Related Art

FIG. 1 shows a schematic diagram of a prior art pixel 140 disclosed in U.S. Patent Application US20080048949A1. As shown in FIG. 1, the pixel 140 includes an organic light-emitting diode (COED) and a pixel circuit 142. In the case of a pixel 140 located at the n-th row and m-th column, the pixel circuit 142 of the pixel 140 at the n-th row and m-th column is connected to the m-th data line Dm, the n-th scan line Sn, and the n-th emission control line En, and controls the corresponding organic light-emitting diode (OLED).

An anode of the OLED is connected to the pixel circuit 142, while its cathode is connected to a negative driving voltage ELVSS. The OLED generates light with a predetermined luminance corresponding to a current supplied to it from the pixel circuit 142.

When a corresponding scan signal is supplied to the scan line Sn, the pixel circuit 142 controls the amount of current supplied to the OLED based on the corresponding data signal supplied to the data line Dm. Specifically, a predetermined current from a driving transistor included in the pixel circuit 142 is supplied to the OLED, and a predetermined voltage is applied to the corresponding OLED. In this case, the pixel circuit 142 controls the amount of current flowing to the OLED based on the predetermined voltage applied to the OLED.

As shown in FIG. 1, the pixel circuit 142 includes a first transistor M1, a second transistor M2, a third transistor M3, and a storage capacitor Cst. The gate of the first transistor M1 is connected to the n-th scan line Sn, and the first electrode of the first transistor M1 is connected to the data line Dm. The first transistor M1, which is the driving transistor, has its second electrode connected to the gate of the second transistor M2. When the corresponding scan signal is provided to the scan line Sn, the first transistor M1 transfers the corresponding data signal supplied to the data line Dm to the gate of the second transistor M2.

The first electrode of the second transistor M2 is connected to the positive driving voltage ELVDD. The second electrode of the second transistor M2 is connected to the first electrode of the third transistor M3. The second transistor M2 controls the current flowing from the positive driving voltage ELVDD to the negative driving voltage ELVSS through the OLED according to the gate voltage applied to the second transistor M2. Here, the positive driving voltage ELVDD is, for example, an internal supply voltage providing a positive power supply, and the negative driving voltage ELVSS is, for example, a ground potential.

The first electrode of the third transistor M3 is connected to the second electrode of the second transistor M2, and the second electrode of the third transistor M3 is connected to the OLED. The gate of the third transistor M3 is connected to the emission control line En. When the emission control signal is supplied to the emission control line En, for example, when the emission control line is in a high-level state, the third transistor M3 is turned OFF; in other cases, for example, when the emission control line is in a low-level state, the third transistor M3 is turned ON.

One end of the storage capacitor Cst is connected to the gate of the second transistor M2, and the other end is connected to the second electrode of the third transistor M3, i.e., the anode of the OLED. When the first transistor M1 is turned ON, the storage capacitor Cst is charged with a voltage corresponding to the data signal. Additionally, the storage capacitor Cst transfers a voltage change corresponding to the voltage difference on the anode of the OLED to the gate of the second transistor M2.

In the prior art shown in FIG. 1, when the scan signal Sn is at a nigh voltage and the emmission control signal Dm is at a low voltage phase, the first transistor M1 is turned OFF, while the third transistor M3 is turned ON. At this stage, the second transistor M2 delivers be current corresponding to the voltage applied to the first node N1 to the OLED. In this case, the voltage at the second node N2 changes according to the following equation: $\Delta N2=V\_OLED-V\_OLED(Vth)$ Wherein V_OLED represents the voltage applied to the OLED, corresponding to the current flowing through the OLED. Thus, the voltage V_OLED corresponds to the amount or current flowing through the OLED.

Therefore, the voltage at the first node N1, being in a floating state, changes according to the voltage variation at the second node N2, which is determined by the storage capacitor Cst. In the prior art shown in FIG. 1, since the voltage variation at the second node N2 is based on the threshold voltage variation of the second transistor M2, i.e., based on the amount of current flowing to the OLED, the threshold voltage of the second transistor M2 is compensated according to the voltage variation at the second node N2. Therefore, in the prior art shown in FIG. 1, the second transistor M2 subsequently delivers a current corresponding to the voltage applied to the first node N1 to the OILED, so that the OLED generates light with a predetermined luminance corresponding to the supplied current.

In the prior art shown in FIG. 1, the voltage across the OLED, in current applications, such as micro-LED (MicroLED) or OLED, is typically above three volts (V) Thus, the first transistor M1, second transistor M2, and third transistor M3 must be selected with components that can withstand a voltage of 3V or higher, which are larger in size compared to transistors with a voltage rating of 1.2V. Therefore, to control various LEDs such as LED (MicroLED) or OLED, the first transistor M1, second transistor M2, and third transistor M3 in the pixel circuit must be selected with components rated for 3V or higher. Compared to transistors with a lower voltage rating, this pixel circuit requires more space. In the evolution of circuit technology, size reduction has always been considered an important improvement, which is common knowledge in the field.

In view of the above, the present invention provides a pixel circuit of an electroluminescence display that can employ transistors with a relatively lower withstand voltage, thereby reducing the area of the pixel circuit.

SUMMARY OF THE INVENTION

In one perspective, the present invention provides a pixel circuit of an electroluminescence display, comprising: a level shift transistor coupled between a corresponding light-emitting device and a level shift terminal, configured to limit an operation voltage drop between the level shift terminal and a first voltage line based on an enabling light-emitting signal, ensuring that the operation voltage drop does not exceed a clamping level; a bias transistor, configured to operate based on a bias signal to provide a luminance current; and a display transistor, connected in series with the bias transistor between the level shift terminal and the first voltage line, configured to operate based on a display signal to modulate the luminance current to a display current providing to the corresponding light-emitting device; wherein the light-emitting device is coupled between the level shift transistor and a second voltage line, and the first voltage line is different from the second voltage line.

In one embodiment, the level shift transistor, the display transistor, and the bias transistor are coupled in a common-cathode structure, and the level shift transistor, the display transistor, and the bias transistor are all P-type metal oxide semiconductor (PMOS) devices.

In one embodiment, the level shift transistor, the display transistor, and the bias transistor are coupled in a common-anode structure, and the level shift transistor, the display transistor, and the bias transistor are all N-type metal oxide semiconductor (NMOS) devices.

In one embodiment, withstand voltages of the display transistor and the bias transistor both exceed the clamping level.

In one embodiment, the display signal includes a pulse width modulation (PWM) signal with a duty cycle, the PWM signal switches the corresponding display transistor to generate the display current and thereby determine a gray-scale of the corresponding light-emitting device.

In one embodiment, the display transistor is connected in series between the bias transistor and the level shift transistor.

In one embodiment, the bias transistor is connected in series between the display transistor and the level shift transistor.

In one embodiment, the bias transistor and the display transistor share a same transistor.

In one embodiment, a withstand voltage of the level shift transistor exceeds a series voltage drop between the first voltage line and the second voltage line, and the series voltage drop exceeds withstand voltages of the bias transistor and the display transistor.

In one embodiment, the pixel circuit further comprises a gate capacitor, configured to be charged/discharged with the luminance current during a refresh period to maintain the level of the bias signal, and coupled to the bias transistor during a display period to provide the luminance current by maintaining a voltage difference between a transconductance control terminal of the bias transistor and the first voltage line.

In one embodiment, the pixel circuit further comprises a refresh switch, configured to operate based on a refresh signal to provide the luminance current during the refresh period; and an auxiliary switch, configured to connect a transimpedance output terminal of the bias transistor to a transimpedance control terminal during the refresh period, arranged in a diode connection parallel to the gate capacitor between the first voltage line and a current I/O terminal to charge/discharge the capacitor and maintain the level of the bias signal.

In one embodiment, the auxiliary switch is turned off after the refresh period ends, and the refresh period and the display period do not overlap, wherein during the display period, the pixel circuit supplies the display current to the corresponding light-emitting device.

In one embodiment, the bias transistor includes a transimpedance transistor and a transconductance transistor, and the transimpedance transistor and the transconductance transistor do not share a same transistor; wherein the auxiliary switch connects the transimpedance output terminal and the transimpedance control terminal of the transimpedance transistor during the refresh period, arranged in a diode connection parallel to the gate capacitor between the first voltage line and the current I/O terminal to charge/discharge the gate capacitor and maintain the level of the bias signal; wherein the auxiliary switch is turned off during the display period, and the gate capacitor is coupled between the first voltage line and the transconductance control terminal of the transconductance transistor to provide the luminance current based on the voltage difference between the transconductance control terminal of the transconductance transistor and the first voltage line.

In one embodiment, the refresh period and the display period may optionally have an overlap period or may not overlap.

In one embodiment, the transimpedance transistor, the auxiliary switch, and the transconductance transistor form a current mirror circuit, and during the refresh period, the luminance current is mirrored and converted to the luminance current.

The advantage of the present invention is that the circuit can employ transistors with a withstand voltage relatively lower than the series voltage drop between the first voltage line and the second voltage line, applied in the pixel circuit of an electroluminescence display, thereby relatively reducing the area of the pixel circuit.

The objectives, technical details, features, and effects of the present invention will be better understood with regard to the detailed description of the embodiments below, with reference to the attached drawings.

DESCRIPTION OF THE PREFERRED EMBODIMENTS

The drawings as referred to throughout the description of the present invention are for illustration only, to show the interrelations between the circuits and the signal waveforms, but not drawn according to actual scale.

Figure 1:
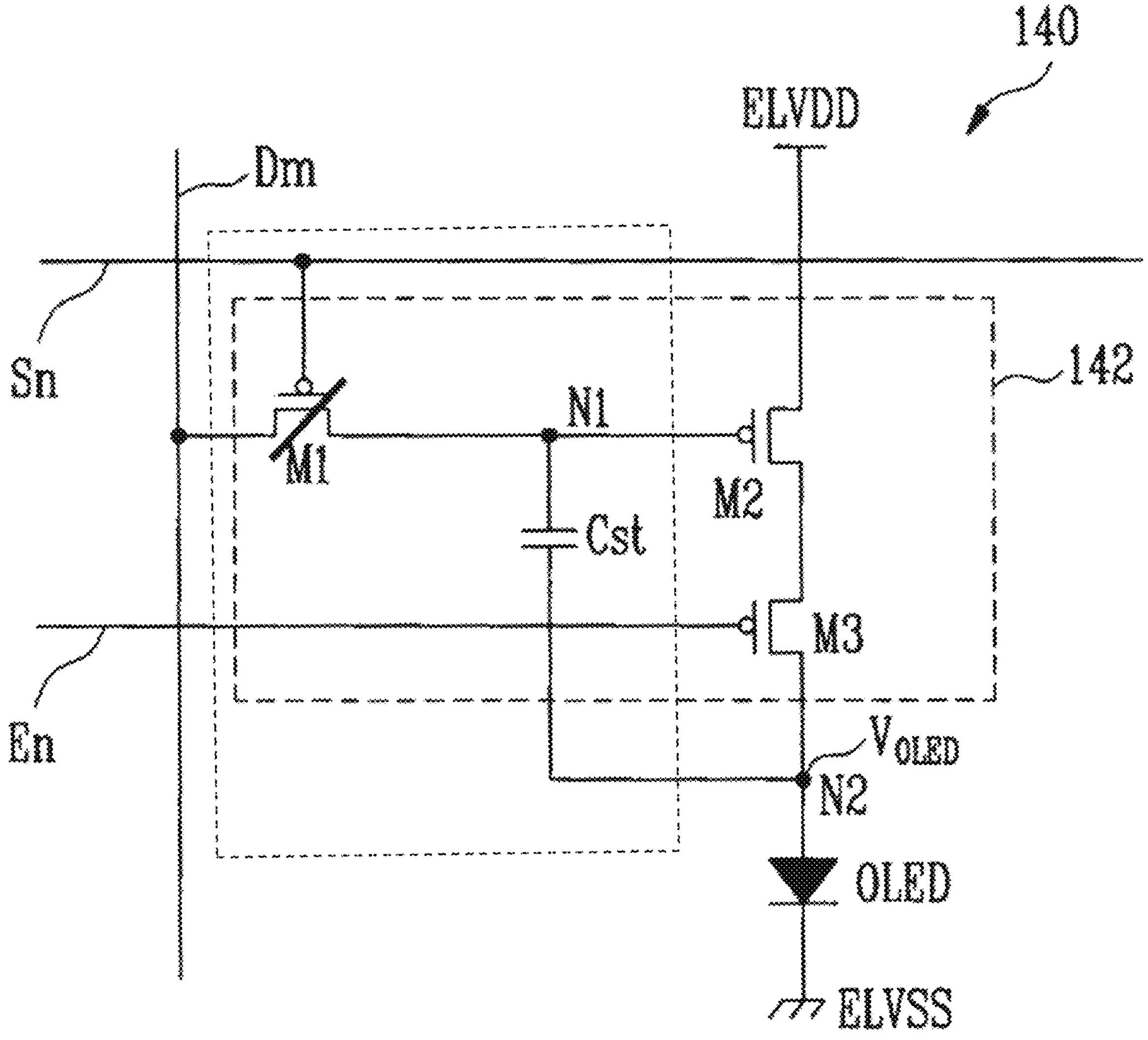
FIG. 1 (Prior Art)
FIG. 1 shows a schematic diagram of a prior art pixel 140.
Figure 2:
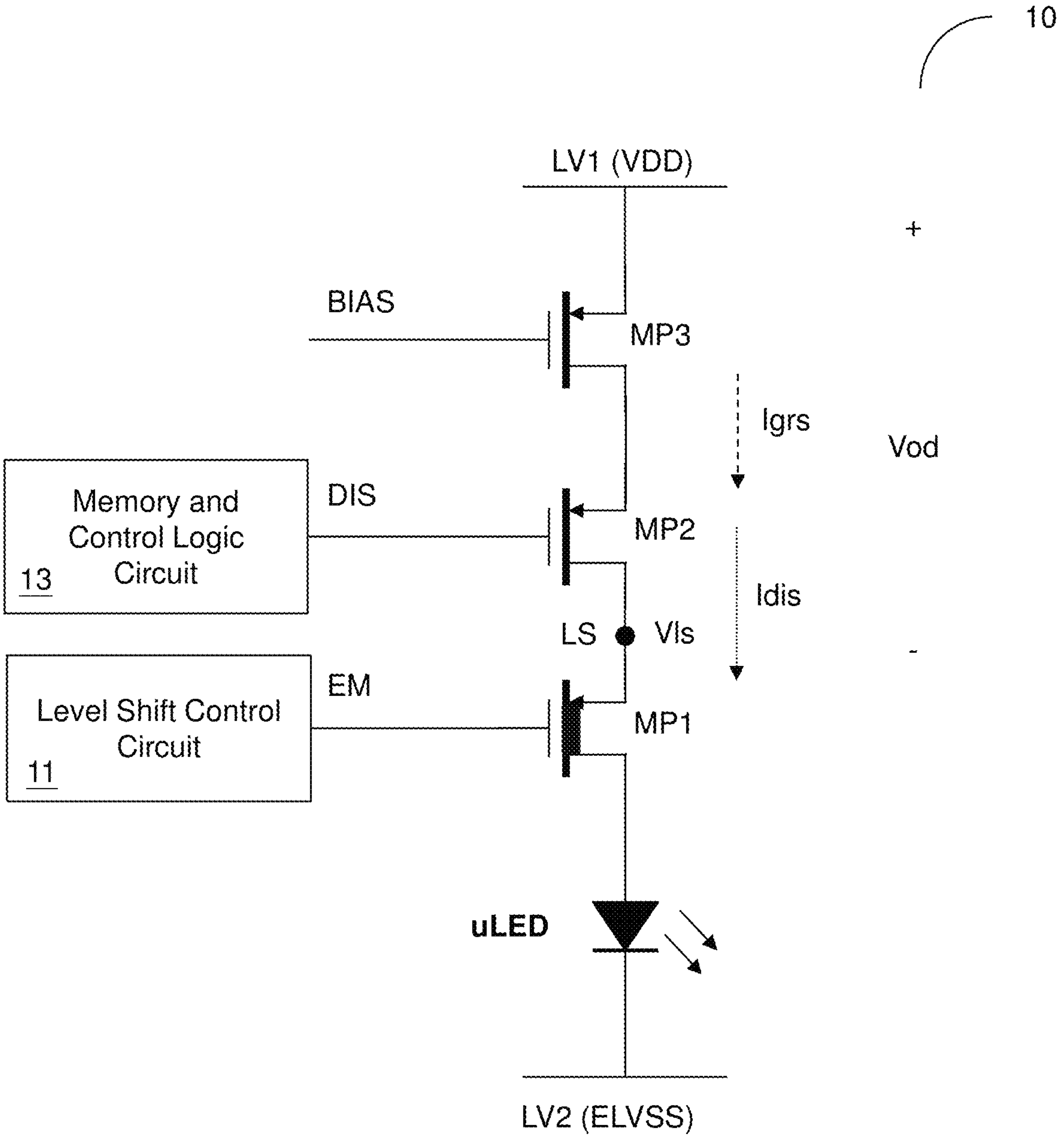
FIG. 2 is a schematic diagram of a pixie circuit of an electroluminescence display according to an embodiment of the present invention.

FIG. 2 is a schematic diagram of a pixel circuit of an electroluminescence display according to an embodiment of the present invention. As shown in FIG. 2, the pixel circuit 10 of the electroluminescence display includes a level shift transistor MP1, a display transistor MP2, and a bias transistor MP3. As shown in FIG. 2, the level shift transistor MP1 is coupled between a corresponding light-emitting device uLED and a level shift terminal LS, and is configured to limit an operation voltage drop Vod between a voltage Vls of the level shift terminal LS and a first voltage line LV1 to not exceed a clamping level, based on an enabling light-emitting signal EM generated by a level shift control circuit 11. The bias transistor MP3 is configured to operate based on a bias signal BIAS to provide a luminance current Igrs. The display transistor MP2 is connected in series with the bias transistor MP3 between the level shift terminal LS and the first voltage line LV1, and is configured to operate based on a display signal DIS to modulate the luminance current Igrs into a display current Idis, which is then provided to the corresponding light-emitting device uLED. The light-emitting device uLED is coupled between the level shift transistor MP1 and a second voltage line LV2, wherein the first voltage line LV1 and the second voltage line LV2 are different, indicating that a series voltage drop between the first voltage line LV1 and the second voltage line LV2 is a non-zero voltage. The light-emitting device uLED may include, but is not limited to, a light-emitting diode (LED), micro-light-emitting diode (MicroLED) or organic light-emitting diode (OLED).

In this embodiment, the level shift transistor MP1, the display transistor MP2, and the bias transistor MP3 are coupled in a common-cathode structure, and the level shift transistor MP1, the display transistor MP2, and the bias transistor MP3 are all P-type metal oxide semiconductor (PMOS) devices.

In this embodiment, withstand voltages of the display transistor MP2 and the bias transistor MP3, for example, both exceed the clamping level. In other words, the level shift transistor MP1 uses a transistor with a relatively higher withstand voltage and is used to limit the operation voltage drop Vod between the voltage Vls of the level shift terminal LS and the first voltage line LV1 to not exceed the clamping level. Thus, as long as a withstand voltage of the level shift transistor MP1 exceeds a voltage difference between the first voltage line LV1 and the second voltage line LV2, and the display transistor MP2 and bias transistor MP3 use transistors with withstand voltages that exceed the clamping level, the configuration of the present invention ensures chat no damage occurs under normal operation. In other words, the display transistor MP2 and the bias transistor MP3 can both use transistors with relatively lower withstand voltages, which are less than the voltage difference between the first voltage line LV1 and the second voltage lien LV2, thereby reducing the pixel circuit area. From another perspective, according to the configuration of the present invention, during operation, the cross-voltage (such as source-drain voltage or gate-drain voltage) of the display transistor MP2 and bias transistor MP3 is limited to below the clamping level. When the clamping level is chosen to be sufficiently low, the display transistor MP2 and bias transistor MP3 can use transistors with relatively lower withstand voltages, thus reducing the pixel circuit area.

For example, the first voltage line LV1 may be a positive supply voltage VDD, such as 1.2V, and the second voltage line LV2 may be a negative driving voltage ELVSS, with a potential between −3V and −8V. The level shift transistor MP1, based on the enabling light-emitting signal EM, limits the operation voltage drop Vod between the voltage Vls of the level shift terminal LS and the first voltage line LV1 to not exceed 1.2V, meaning that the clamping level is, for example, 1.2V Therefore, as long as both the display transistor MP2 and the bias transistor MP3 use transistors with a withstand voltage greater than 1.2V (components with a 1.2V withstand voltage are smaller in size compared to those with an 8V withstand voltage), no damage will occur under normal operation. On the other hand, taking the negative driving voltage ELVSS as −6.4V as an example, the level shift transistor MP1 must be selected with a withstand voltage exceeding 76V, but the display transistor MP2 and bias transistor MP3, which are in series between the first voltage line LV1 and the second voltage line LV2, can be selected with a withstand voltage exceeding 1.2V; only the level shift transistor MP1'S withstand voltage needs to exceed the series voltage drop of 7.6V. Because the pixel circuit uses some transistors with lower withstand voltages (smaller size), it does not need to use only high withstand voltage (larger size) transistors, thereby relatively reducing the pixel circuit area and achieving a relatively higher resolution per unit area of the display panel.

In this embodiment, the level shift control circuit 11, for example, during an enabling period when the corresponding light-emitting device uLED emits light, generates an enabling light-emitting signal EM to turn on the level shift transistor MP1, thereby limiting the operation voltage drop Vod between the voltage Vls of the level shift terminal LS and the first voltage line LV1 to not exceed the clamping level. The enabling period can be set by the user or determined based on signals generated by other circuits.

In this embodiment, a memory and control logic circuit 13 generates a display signal DIS, which includes a pulse width modulation (PWM) signal with a duty cycle. The PWM signal is used to switch the corresponding display transistor MP2 to generate the display current Idis, thereby determining the grayscale of the corresponding light-emitting device uLED. The memory and control logic circuit 13, for example, generates the display signal DIS based on the output of a pulse width modulation signal generating circuit in conjunction with predetermined temporary or long-term memory settings. For example, the luminance current Igrs is the current that makes the light-emitting device uLED the brightest (maximum luminance), and this current is modulated by the display signal DIS containing the PWM signal to adjust the grayscale of the light-emitting device uLED according to user needs.

In this embodiment, the display transistor MP2 is connected in series between the bias transistor MP3 and the level shift transistor MP1.

In this embodiment, the bias transistor MP3 and the display transistor MP2 do not share the same transistor but are different transistors.

It should be noted that the bias transistor MP3 is configured to operate based on the bias signal BIAS to provide a luminance current Igrs. The luminance current Igrs needs to have a fixed and stable level when the corresponding light-emitting device uLED emits light to ensure that the light-emitting device uLED emits light with a fixed and stable luminance; and the grayscale of the corresponding light-emitting device uLED is determined by the duty cycle of the PWM signal of the display signal DIS. Therefore, in one embodiment, for example, when the corresponding light-emitting devi e uLED emits light, the gate-source voltage of the bias transistor MP3 is maintained at a fixed and stable level to provide a fixed and stable luminance current Igrs.

Figure 3:
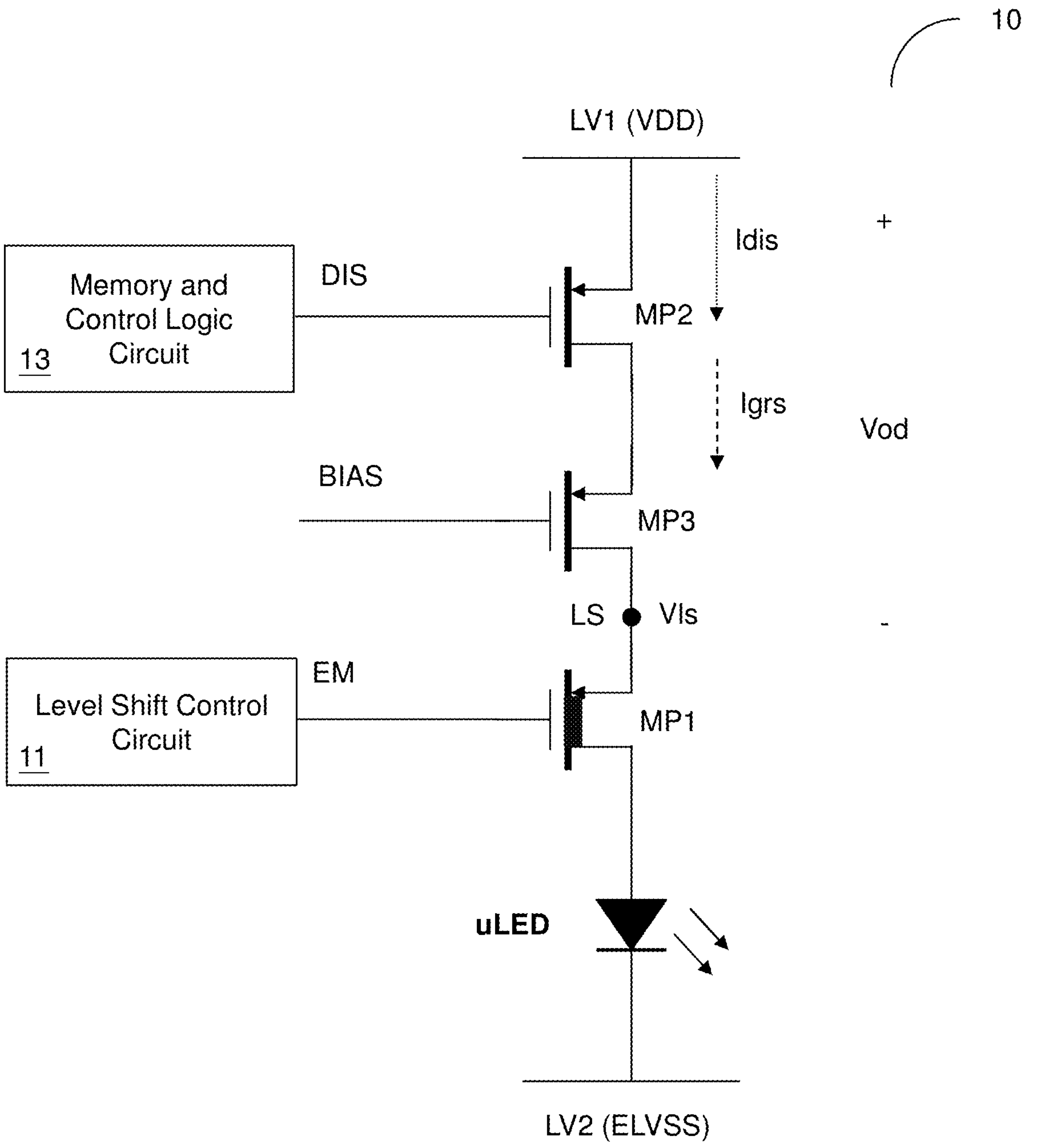
FIG. 3 is a schematic diagram of a pixel circuit of an electroluminescence display according to an embodiment of the present invention.

FIG. 3 is a schematic diagram of a pixel circuit of an electroluminescence display according to another embodiment of the present invention. The pixel circuit 10 of the electroluminescence display shown in FIG. 3 is similar to the common-cathode structure shown in FIG. 2. The difference between the embodiment 10 shown in FIG. 3 and the embodiment shown in FIG. 2 is that, in the pixel circuit 10 of the electroluminescence display shown in FIG. 3, the bias transistor MP3 is connected in series between the display transistor MP2 and the level shift transistor MP1.

Figure 4:
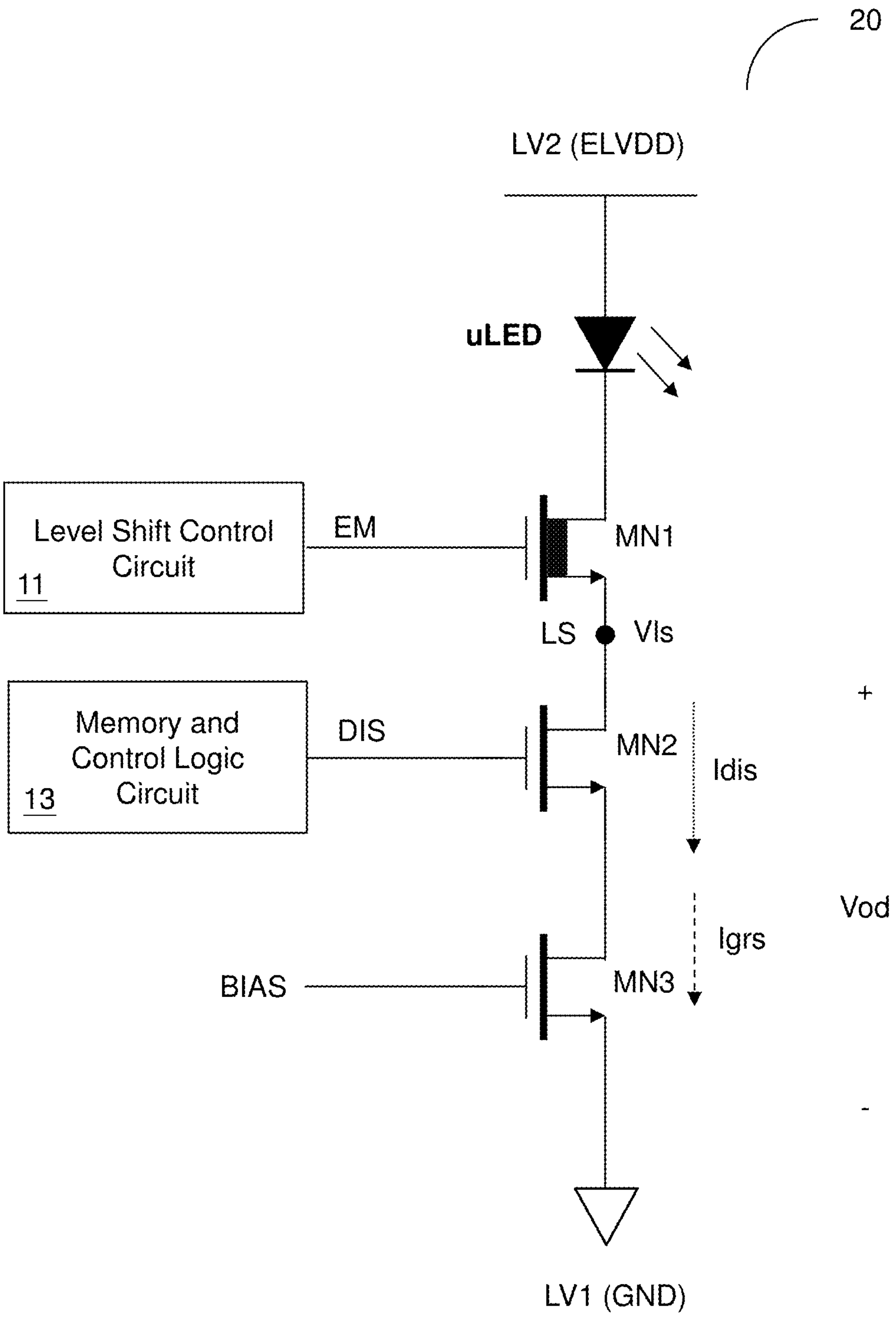
FIG. 4 is a schematic diagram of a pixel circuit of an electroluminescence display according to an embodiment of the present invention.

FIG. 4 is a schematic diagram of a pixel circuit of an electroluminescence display according to another embodiment of the present invention. As shown in FIG. 4, the pixel circuit 20 of the electroluminescence display includes a level shift transistor MN1, a display transistor MN2, and a bias transistor MN3. As shown in FIG. 4, the level shift transistor MN1 is coupled between the corresponding light-emitting device uLED and the level shift terminal LS and is configured to limit the operation voltage drop Vod between the voltage Vls of the level shift terminal LS and the first voltage line LV1 to not exceed the clamping level, based on the enabling light-emitting signal EM generated by a level shift control circuit 11. The bias transistor MN3 is configured to operate based on a bias signal BIAS to provide a luminance current Igrs. The display transistor MN2 is connected in series with the bias transistor MN3 between the level shift terminal LS and the first voltage line LV1 and is configured to operate based on a display signal DIS to modulate the luminance current Igrs into a display current Idis, which is then provided to the corresponding light-emitting device uLED. The light-emitting device uLED is coupled between the level shift transistor MN1 and the second voltage line LV2, where the first voltage line LV1 and the second voltage line LV2 are different, indicating that the series voltage drop between the first voltage line LV1 and the second voltage line LV2 is a non-zero voltage.

In this embodiment, the level shift transistor MN1, display transistor MN2, and bias transistor MN3 are coupled in a common-anode structure, and the level shift transistor MN1, display transistor MN2, and bias transistor MN3 are all N-type metal oxide semiconductor (NMOS) devices.

In this embodiment, withstand voltages of the display transistor MN2 and the bias transistor MN3, for example, both exceed the clamping level. In other words, the level shift transistor MN1 uses a transistor with a relatively higher withstand voltage and is used to limit the operation voltage drop Vod between the voltage Vls of the level shift terminal LS and the first voltage line LV1 to not exceed the clamping level. Thus, as long as the withstand voltage of the level shift transistor MN1 exceeds the voltage difference between the first voltage line LV1 and the second voltage line LV2, and the display transistor MN2 and bias transistor MN3 use transistors with withstand voltages that exceed the clamping level, the configuration of the present invention ensures that no damage occurs under normal operation. In other words, the display transistor MN2 and bias transistor MN3 can both use transistors with relatively lower withstand voltages, which are less than the voltage difference between the first voltage line LV1 and the second voltage line LV2, thereby reducing the pixel circuit area.

For example, the first voltage line LV1 may be a ground potential GND, such as 0V, and the second voltage line LV2 may be a positive driving voltage ELVDD, with a potential between 3V and 8V. The level shift transistor MN1, based on the enabling light-emitting signal EM, limits the operation voltage drop Vod between the voltage Vls of the level shift terminal LS and the first voltage line LV1 to not exceed 1.2V, meaning that the clamping level is, for example, 1.2V. Therefore, as long as both the display transistor MN2 and the bias transistor MN3 use transistors with a withstand voltage greater than 1.2V (components with a 1.2V withstand voltage are smaller in size compared to those with an 8V withstand voltage), no damage will occur under normal operation. On the other hand, taking the positive driving voltage ELVDD as 7.6V as an example, the level shift transistor MN1 must be selected with a withstand voltage exceeding 7.6V, but the display transistor MN2 and bias transistor MN3, which are in series between the first voltage line LV1 and the second voltage line LV2, can be selected with a withstand voltage exceeding 1.2V; only the level shift transistor MN1's withstand voltage needs to exceed the series voltage drop of 7.6V. Because the pixel circuit uses some transistors with lower withstand voltages (smaller size), it does not need to use only high withstand voltage (larger size) transistors, thereby relatively reducing the pixel circuit area and achieving a relatively higher resolution per unit area of the display panel.

In this embodiment, the display transistor MN2 is connected in series between the bias transistor MN3 and the level shift transistor MN1.

In this embodiment, the bias transistor MN3 and the display transistor MN2 do not share the same transistor but are different transistors.

Figure 5:
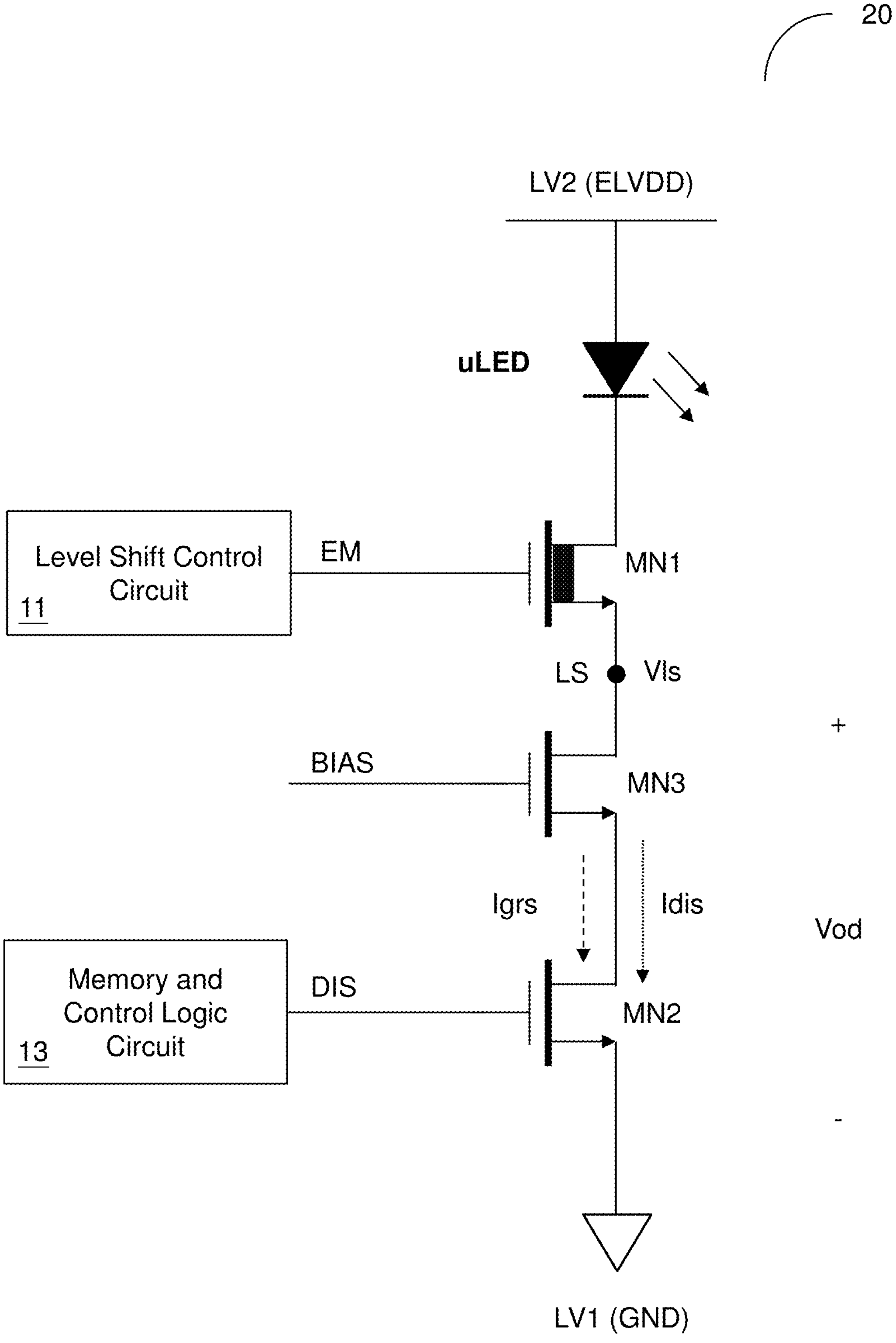
FIG. 5 is a schematic diagram of a pixel circuit of an electroluminescence display according to another embodiment of the present invention.

FIG. 5 is a schematic diagram of a pixel circuit of an electroluminescence display according to another embodiment of the present invention. The pixel circuit 20 of the electroluminescence display shown in FIG. 5 is similar to the common-anode structure shown in FIG. 4. The difference between the embodiment 20 shown in FIG. 5 and the embodiment shown in FIG. 4 is that, in the pixel circuit 20 of the electroluminescence display shown in FIG. 5, the bias transistor MN3 is connected in series between the display transistor MN2 and the level shift transistor MN1.

Figure 6:
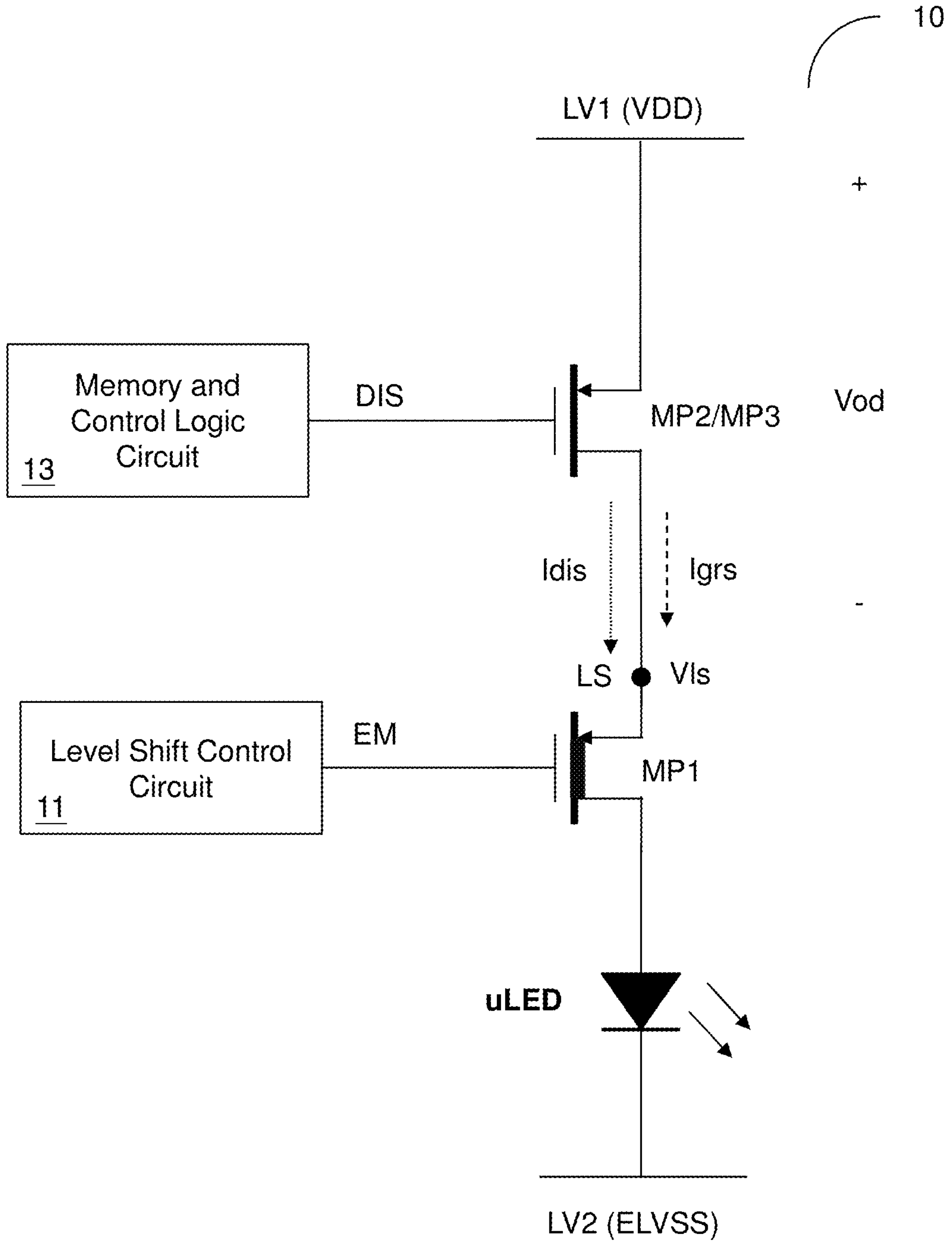
FIG. 6 is a schematic diagram of a pixel circuit of an electroluminescence display according to another embodiment of the present invention.

FIG. 6 is a schematic diagram of a pixel circuit of an electroluminescence display according to another embodiment of the present invention. The pixel circuit 10 of the electroluminescence display shown in FIG. 6 is similar to the common-cathode structure shown in FIG. 2. The difference between the embodiment shown in FIG. 6 and the embodiment shown in FIG. 2 is that in the pixel circuit 10 of the electroluminescence display shown in FIG. 6, the bias transistor MP3 and the display transistor MP2 share the same transistor, i.e., a bias-display transistor MP2/MP3. It should be noted that in this embodiment, when the bias transistor MP3 and the display transistor MP2 share the same transistor, i.e., the bias-display transistor MP2/MP3, the display signal DIS not only provides a pulse width modulation (PWM) signal to control the grayscale of the light-emitting device uLED but also, when the display signal DIS reaches the enabling level (in this embodiment, a low level, since the bias-display transistor MP2/MP3 is a PMOS device and conducts at a low level to make the light-emitting device uLED emit light), maintains the luminance current Igrs (in this embodiment, the luminance current Igrs is the same as the display current Idis) at a fixed and stable level to ensure that the corresponding light-emitting device uLED emits light with fixed and stable luminance.

Figure 7:
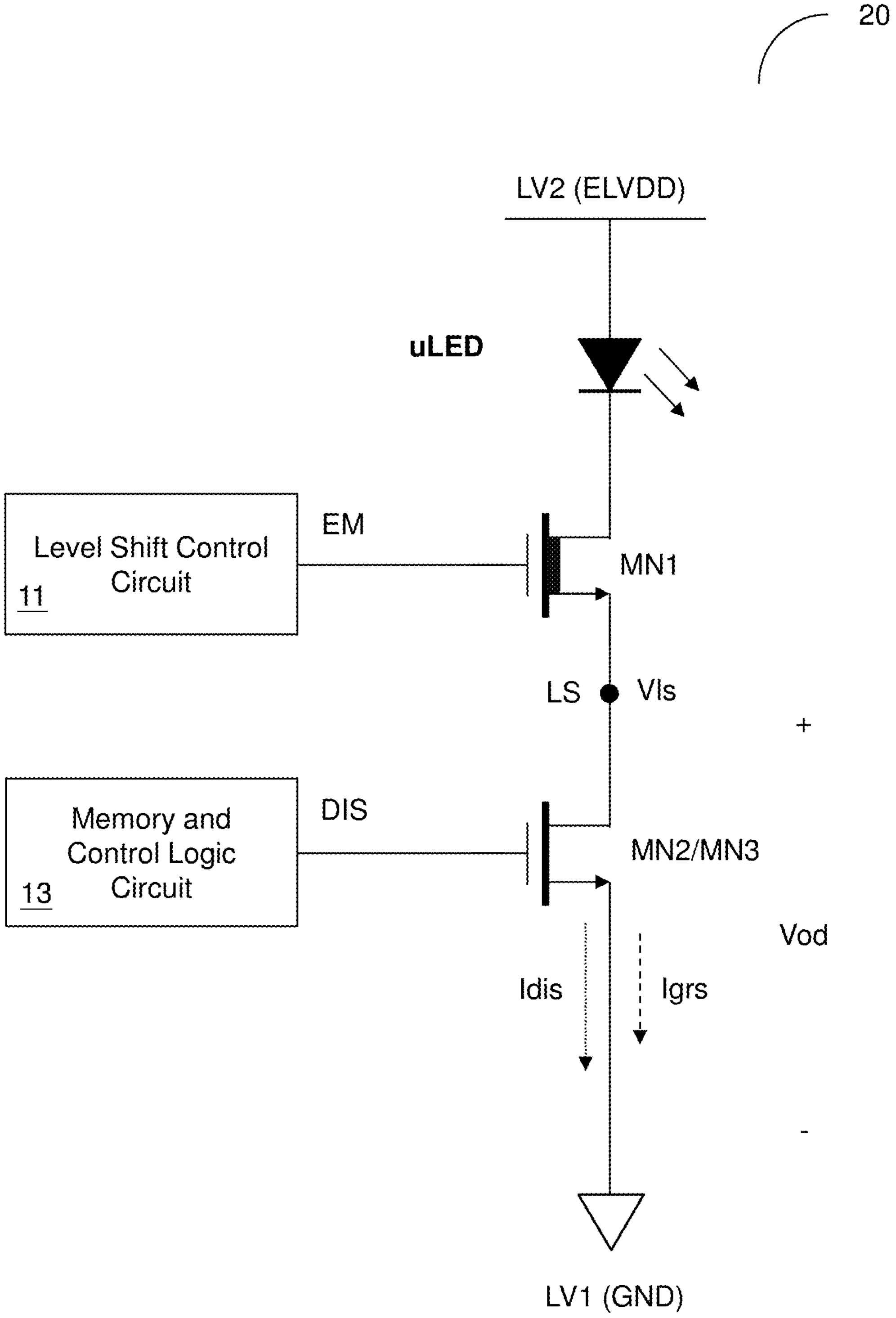
FIG. 7 is a schematic diagram of a pixel circuit of an electroluminescence display according to another embodiment of the present invention.

FIG. 7 is a schematic diagram of a pixel circuit of an electroluminescence display according to another embodiment of the present invention. The pixel circuit 20 of the electroluminescence display shown in FIG. 7 is similar to the common-cathode structure shown in FIG. 4. The difference between the embodiment shown in FIG. 7 and the embodiment shown in FIG. 4 is that in the pixel circuit 20 of the electroluminescence display shown in FIG. 7, the bias transistor MN3 and the display transistor MN2 share the same transistor, i.e., a bias-display transistor MN2/MN3. It should be noted that in this embodiment, when the bias transistor MN3 and the display transistor MN2 share the same transistor, i.e., the bias-display transistor MN2/MN3, the display signal DIS not only provides a pulse width modulation (PWM) signal to control the grayscale of the light-emitting device uLED but also, when the display signal DIS reaches the enabling level (in this embodiment, a high level, since the bias-display transistor MN2/MN3 is an NMOS device and conducts at a high level to make the light-emitting device uLED emit light), maintains the luminance current Igrs (in this embodiment, the luminance current Igrs is the same as the display current Idis) at a fixed and stable level to ensure that the corresponding light-emitting device uLED emits light with fixed and stable luminance.

Figure 8:
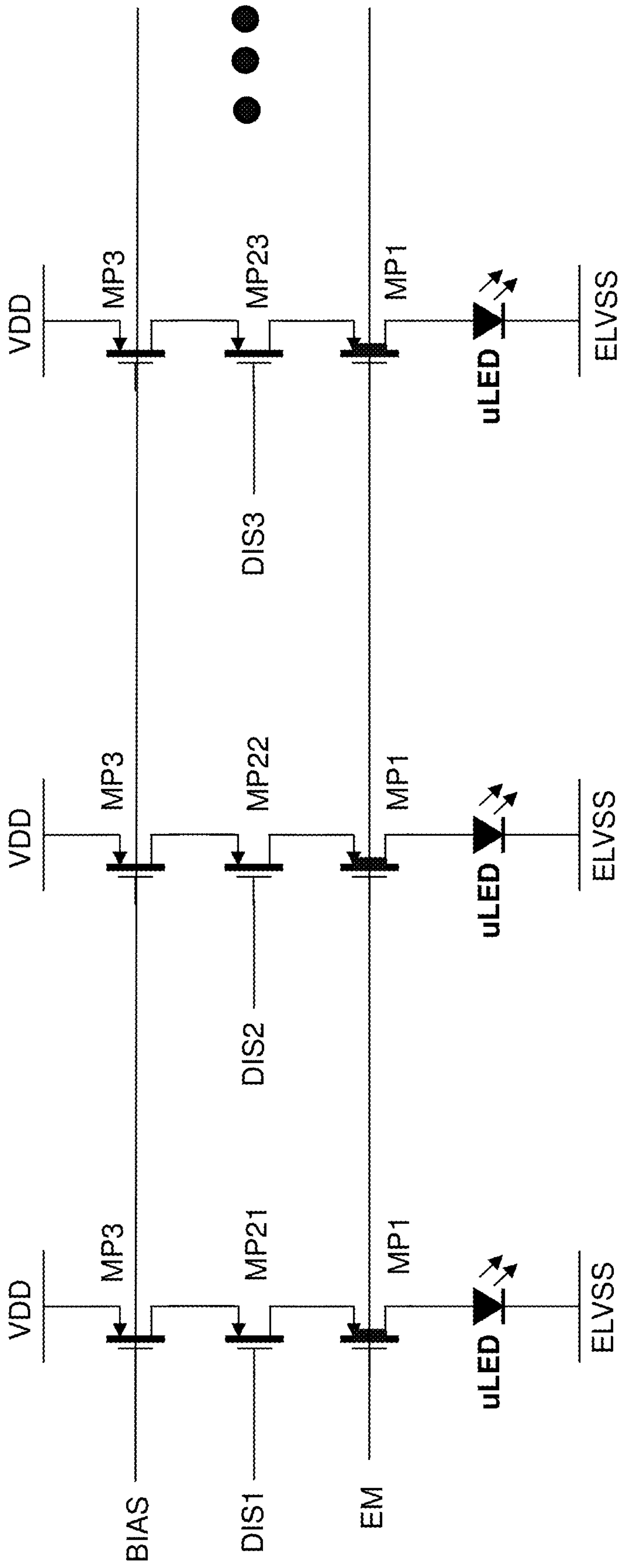
FIG. 8 is a schematic diagram of a pixel circuit of an electroluminescence display according to yet another embodiment of the present invention.

FIG. 8 is a schematic diagram of a pixel circuit of an electroluminescence display according to yet another embodiment of the present invention. This embodiment illustrates the case where multiple pixel circuits of an electroluminescence display are connected in parallel. As shown in FIG. 8, in the parallel-connected pixel circuits of an electroluminescence display, multiple bias transistors MP3 can operate based on the same bias signal BIAS, and multiple level shift transistors MP1 can operate based on the same enabling light-emitting signal EM, while multiple display transistors MP21, MP22, MP23, etc., can operate based on their respective display signals DIS1, DIS2, DIS3, etc., to determine the grayscale of their corresponding light-emitting devices uLED. In this embodiment, the level shift transistors MP1, display transistors MP2, and bias transistors MP3 in the multiple pixel circuits of an electroluminescence display are, for example, all PMOS devices.

Figure 9:
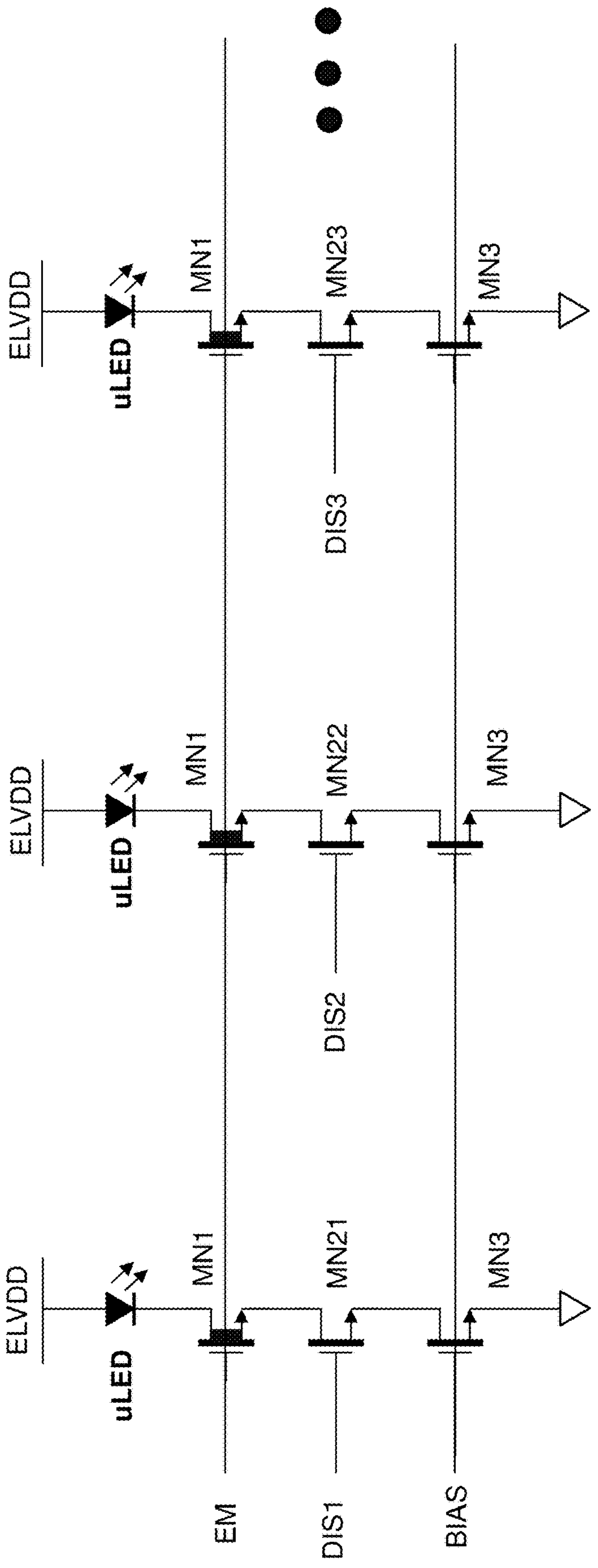
FIG. 9 is a schematic diagram of a pixel circuit of an electroluminescence display according to yet another embodiment of the present invention.

FIG. 9 is a schematic diagram of a pixel circuit of an electroluminescence display according to yet another embodiment of the present invention. This embodiment illustrates the case where multiple pixel circuits of an electroluminescence display are connected in parallel. As shown in FIG. 9, in the parallel-connected pixel circuits of an electroluminescence display, multiple bias transistors MN3 can operate based on the same bias signal BIAS, and multiple level shift transistors MN1 can operate based on the same enabling light-emitting signal EM, while multiple display transistors MN2A, MN2B, MN2C, etc., can operate based on their respective display signals DIS1, DIS2, DIS3, etc., to determine the grayscale of their corresponding light-emitting devices uLED. In this embodiment, the level shift transistors MN1, display transistors MN2, and bias transistors MN3 in the multiple pixel circuits of an electroluminescence display are, for example, all NMOS devices.

Figure 10:
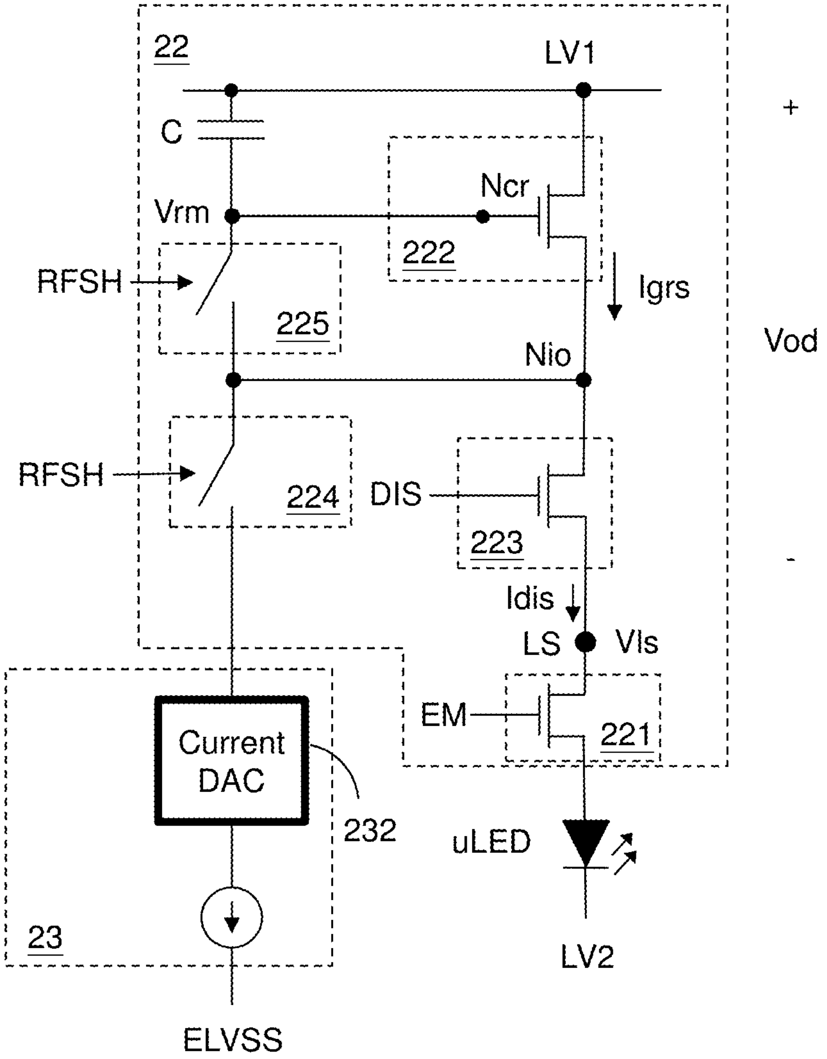
FIG. 10 is a schematic diagram of a pixel circuit of an electroluminescence display according to yet another embodiment of the present invention.

FIG. 10 is a schematic diagram of a pixel circuit of an electroluminescence display according to one embodiment of the present invention. This embodiment shows a schematic of a pixel circuit 22 of an electroluminescence display that can operate in a non-overlap mode. As shown in FIG. 10, the pixel circuit 22 of the electroluminescence display includes a level shift transistor 221, a bias transistor 222, a display transistor 223, a refresh switch 224, an auxiliary switch 225, and a capacitor C. In this embodiment, the level shift transistor 221 is coupled between the corresponding light-emitting device uLED and the level shift terminal LS and is configured to limit the operation voltage drop Vod between the voltage Vls of the level shift terminal LS and the first voltage line LV1 to not exceed the clamping level, based on the enabling light-emitting signal EM. The bias transistor 222 is configured to operate based on a bias signal Vrm to provide a luminance current Igrs. The display transistor 223 is connected in series with the bias transistor 222 between the level shift terminal LS and the first voltage line LV1, and is configured to operate based on a display signal DIS to modulate the luminance current Igrs into a display current Idis, which is then provided to the corresponding light-emitting device uLED. The light-emitting device uLED is coupled between the level shift transistor 221 and the second voltage line LV2, where the first voltage line LV1 and the second voltage linen LV2 are different.

During the refresh period, the refresh switch 224 and the auxiliary switch 225 operate based on a refresh signal RFSH to turn on, and connect the transimpedance output terminal Nio and the transimpedance control terminal Ncr of the bias transistor 222, configuring the bias transistor 222 (or its transimpedance transistor, as detailed later) in a diode-connected configuration. The diode-connected bias transistor 222 (or its transimpedance transistor) and the capacitor C are connected in parallel between the first voltage line LV1 and the current digital-to-analog converter (DAC) 232 of the corresponding driving circuit 23, thereby charging/discharging the capacitor C during the refresh period to maintain the bias signal Vrm. It should be noted that configuring the transistor in a diode connection and the gate capacitance of the MOS capacitor are well-known to those skilled in the art and will not be further described here.

Referring again to FIG. 10, the refresh switch 224 operates based on the refresh signal RFSH. In this embodiment, the refresh switch 224 and the auxiliary switch 225 operate synchronously, turning on during the refresh period to charge/discharge the capacitor C; the refresh switch 224 and the auxiliary switch 225 are turned off after the refresh period to prevent leakage of the capacitor C.

In one embodiment, the bias transistor 222 includes a transimpedance transistor and a transconductance transistor. In the pixel circuit 22 shown in FIG. 10, it is suitable to operate in a non-overlap mode, meaning the refresh period and the display period do not overlap. Therefore, the transimpedance transistor and the transconductance transistor of the bias transistor 222 can share the same transistor. In this configuration, during the refresh period, the transistor functions as the transimpedance transistor of the bias transistor 222; and during the display period, the transistor functions as the transconductance transistor of the bias transistor 222. In one embodiment, the refresh signal RESH is a periodic signal with a fixed cycle, charging the capacitors C in multiple pixel circuits 22 of the light-emitting device array in turn during the refresh period. In one embodiment, the cycle of the refresh signal RESH is related to the leakage rate of the capacitor C. It should be noted that the refresh period and the display period do not overlap for the same pixel circuit 22, meaning that when one pixel circuit 22 operates during the display period, another pixel circuit 22 can operate during the refresh period.

Figure 11:
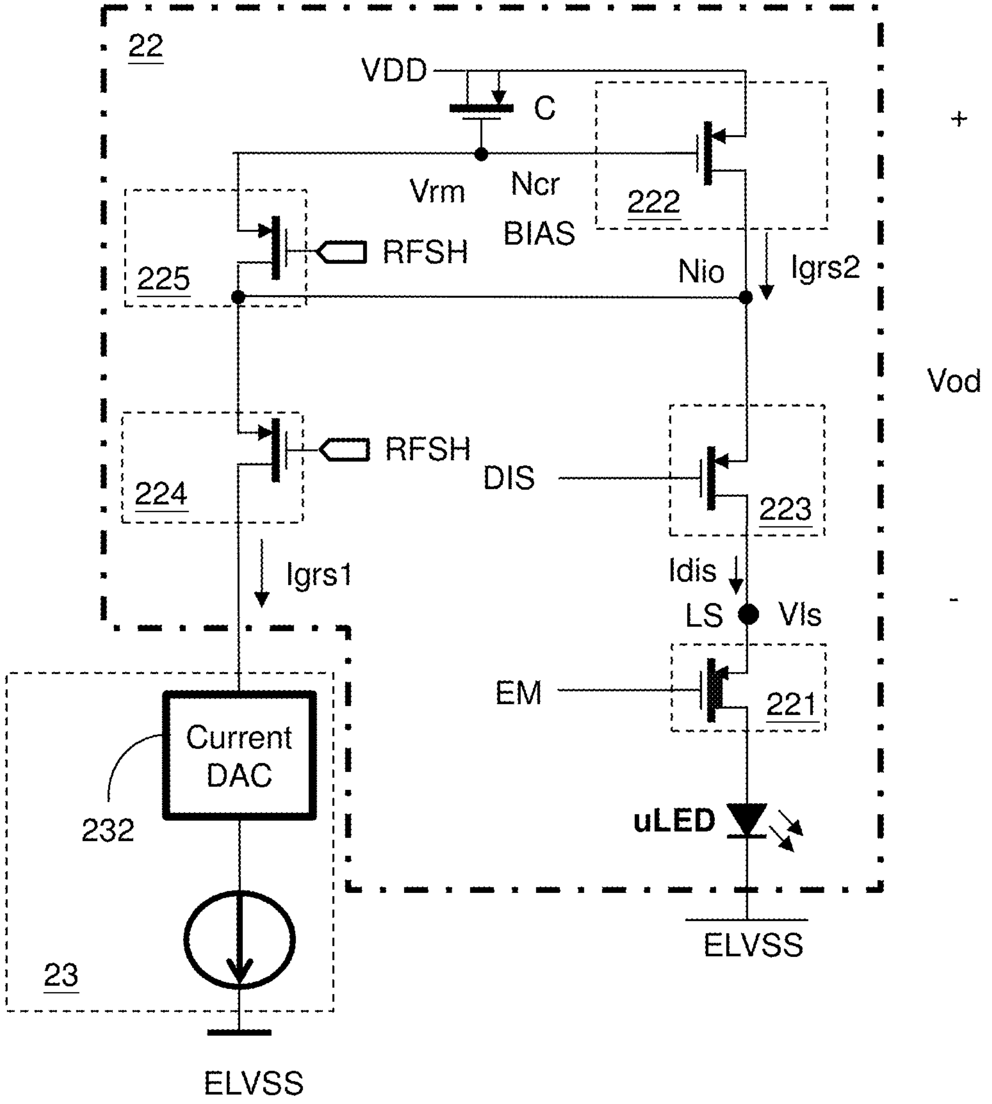
FIG. 11 is a schematic diagram of a pixel circuit of an electroluminescence display according to yet another embodiment of the present invention.

FIG. 11 is a schematic diagram of a pixel circuit of an electroluminescence display according to yet another embodiment of the present invention. The pixel circuit 22 of the electroluminescence display shown in FIG. 11 is a more specific embodiment of the pixel circuit 22 shown in FIG. 10. As shown in FIG. 11, in the pixel circuit 22 of the electroluminescence display, the level shift transistor 221, bias transistor 222, display transistor 223, refresh switch 224, and auxiliary switch 225 are, for example, but not limited to, all PMOS devices, and the capacitor C includes the gate capacitance of a MOS capacitor. In this embodiment, the transimpedance transistor and the transconductance transistor of the bias transistor 222 are the same transistor. The display transistor 223 operates based on the display signal DIS. In this embodiment, the display transistor 223, bias transistor 222, capacitor C, auxiliary switch 225, and refresh switch 224 are all P-type metal oxide semiconductor (MOS) devices. According to the present invention, the display transistor 223, bias transistor 222, capacitor C, auxiliary switch 225, and refresh switch 224 may also be NMOS devices, with the corresponding components and circuits adjusted accordingly. In this embodiment, the drain of the bias transistor 222 serves as the transimpedance output terminal Nio, and the gate serves as the transimpedance control terminal Ncr.

Referring further to FIG. 11, during the refresh period, the refresh signal RFSH turns on the auxiliary switch 225 and the refresh switch 224, allowing the first luminance current Igrs1 to flow through the transimpedance transistor and gate capacitor connected in parallel between the first voltage line VDD and the current digital-to-analog converter 232, meaning that the total current flowing through the transimpedance transistor and the capacitor C (gate capacitance) is equal to the first luminance current Igrs1. Since the transimpedance transistor of the bias transistor 222 is configured in a diode-connected configuration, with the first luminance current Igrs1 partially flowing through the transimpedance transistor, it ensures that the transimpedance transistor operates in the saturation region an a steady state. The gate-source voltage of the transimpedance transistor will gradually increase until it reaches the operating point corresponding to the current flowing through the transimpedance transistor equal to the first luminance current Igrs1 and then stops increasing. When the gate-source voltage of the transimpedance transistor stops increasing, the voltage across the gate capacitor also stops increasing. By appropriately arranging the electrical characteristics of the transimpedance transistor, the voltage of the transimpedance control terminal Ncr is maintained at a fixed bias signal Vrm. After the refresh period ends, the refresh signal RFSH turns off the auxiliary switch 225 and the refresh switch 224, preventing the gate capacitor from leaking and maintaining the bias signal Vrm.

During the display period, since the gate capacitor is coupled between the gate and source of the transconductance transistor of the bias transistor 222, the gate-source voltage of the transconductance transistor is determined by the voltage across the gate capacitor. Therefore, the transconductance transistor generates a second luminance current Igrs2 based on the bias signal Vrm, which is positively correlated with the first luminance current Igrs1 (equal in one embodiment since the transimpedance transistor and transconductance transistor are the same transistor); the pulse width modulation signal is used as the display signal DIS to switch the display transistor 223, modulating the second luminance current Igrs2 into a display current Idis, thereby determining the grayscale of the light-emitting device uLED. The refresh period and the display period do not overlap, during which the pixel circuit 22 of the elect electroluminescence display supplies the display current Idis to at least one corresponding light-emitting device uLED.

Figure 12:
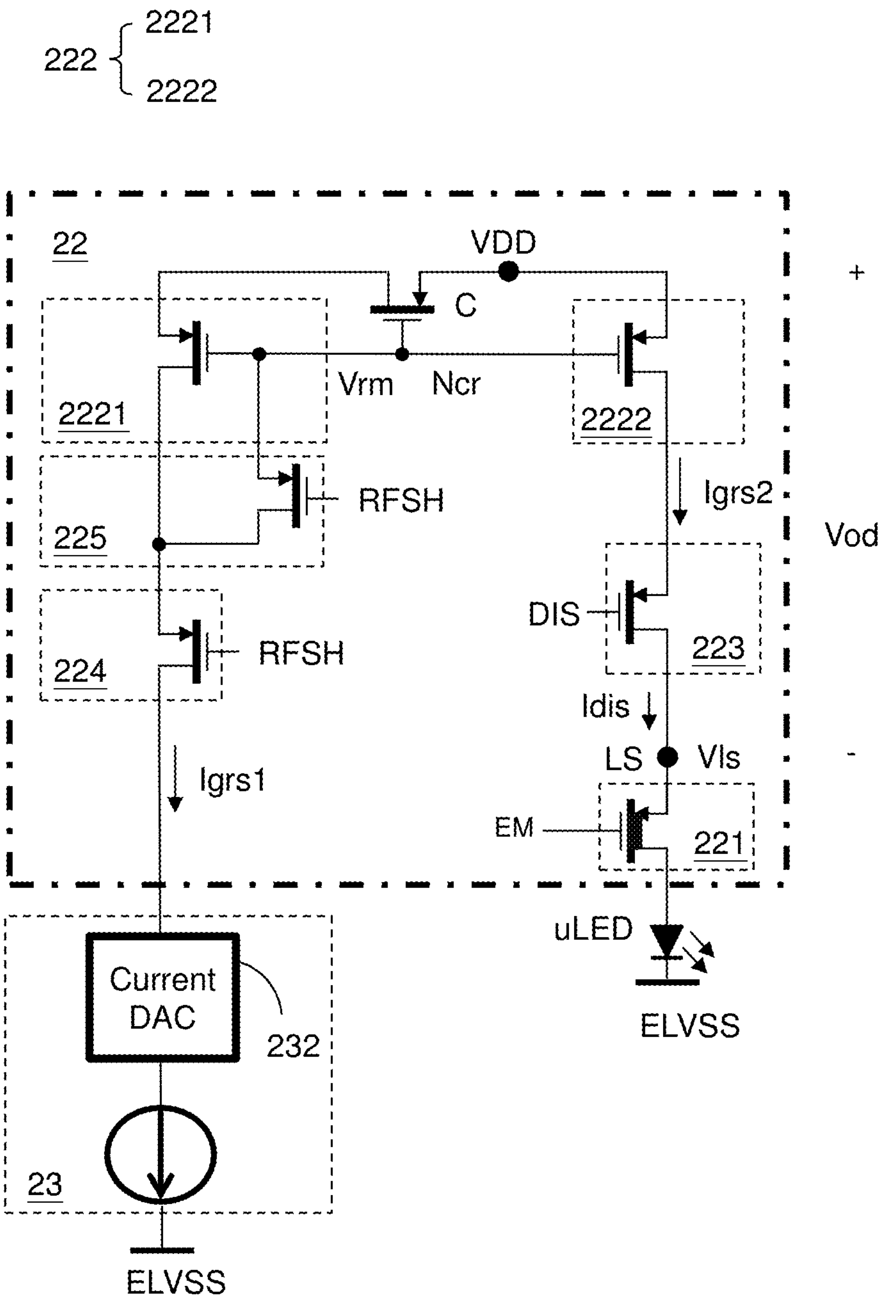
FIG. 12 is a schematic diagram of a pixel circuit of an electroluminescence display according to yet another embodiment of the present invention.

FIG. 12 is a schematic diagram of a pixel circuit or an electroluminescence display according to yet another embodiment of the present invention. The pixel circuit 22 of the electroluminescence display shown in FIG. 12 is a more specific embodiment of the pixel circuit 22 that can operate in an overlap mode. As shown in FIG. 12, the pixel circuit 22 of the electroluminescence display includes a level shift transistor 221, a bias transistor 222 (including a transimpedance transistor 2221 and a transconductance transistor 2222), a display transistor 223, a refresh switch 224, an auxiliary switch 225, and a capacitor C.

Referring further to FIG. 12, during the refresh period, the refresh signal RESH turns on the auxiliary switch 225 and the refresh switch 224, allowing the first luminance current Igrs1 to flow through the transimpedance transistor 2221 and the capacitor C (gate capacitance) connected in parallel between the first voltage line VDD and the current digital-to-analog converter 22, meaning that the total current flowing through the transimpedance transistor 2221 and the gate capacitor is equal to the first luminance current Igrs1. Since the transimpedance transistor 2221 is configured in a diode-connected configuration, with the first luminance current Igrs1 partially flowing through the transimpedance transistor 2221, it ensures that the transimpedance transistor 2221 operates in the saturation region in a steady state. The gate-source voltage of the transimpedance transistor 2221 will gradually increase until it reaches the operating point corresponding to the current flowing through the transimpedance transistor 2221 equal to the first luminance current Igrs1 and then stops increasing. When the gate-source voltage of the transimpedance transistor 2221 stops increasing, the voltage across the gate capacitor also stops increasing. By appropriately arranging the electrical characteristics of the transimpedance transistor 2221, the voltage of the transimpedance control terminal Ncr is maintained at the bias signal Vrm. After the refresh period ends, the refresh signal RESE turns off the auxiliary switch 225 and the refresh switch 224, preventing the gate capacitor from leaking and maintaining the fixed and stable bias signal Vrm during the refresh period.

During the display period, since the gate capacitor (capacitor C) is coupled between the gate and source of the transconductance transistor 2222, the gate-source voltage of the transconductance transistor 2222 is determined by the voltage across the gate capacitor. Therefore, the transconductance transistor 2222 generates a second luminance current Igrs2 based on the bias signal Vrm, which is positively correlated with the first luminance current Igrs1 (equal in one embodiment, as two transistors with the same electrical characteristics can be used for the transimpedance transistor 2221 and the transconductance transistor 2222); the pulse width modulation signal is used as the display signal DIS to switch the display transistor 221, modulating the second luminance current Igrs2 into a display current Idis, thereby determining the grayscale of the light-emitting device uLED. Since the transimpedance transistor 2221 and the transconductance transistor 2222 are two different transistors, the refresh period and the display period can overlap, during which the pixel circuit 22 of the electroluminescence display supplies the display current Idis to at least one corresponding light-emitting device uLED In this embodiment, the transimpedance transistor 2221, auxiliary switch 225, and transconductance transistor 2222 form a current mirror circuit, and during the refresh period, the first luminance current Igrs1 is mirrored into the second luminance current Igrs2. The second luminance current Igrs2 generated by the transconductance transistor 2222 is maintained at a fixed level related to the first luminance current Igrs1. This embodiment can operate in an overlap mode, meaning the refresh period and the display period are not restricted to not overlapping; that is, the refresh period and the display period can optionally have an overlapping period. In one embodiment, the refresh period and the display period have an overlapping period; in another embodiment, the refresh period and the display period do not overlap. Since the transconductance transistor 2222 can generate and maintain the second luminance current Igrs2, which is related to the first luminance current Igrs1, during both the overlap period and the non-overlap period, the refresh period and the display period can overlap in the embodiment shown in FIG. 12. In one embodiment, the refresh signal RFSH is a periodic signal with a fixed cycle, and the cycle of the refresh signal RFSH depends on the matching situation between the current digital-to-analog converter 232 and the pixel circuit 22 of the electroluminescence display. The term "marching situation" refers to whether a single column or multiple column structure is driven by a current digital-to-analog converter 232.

The present invention has been described in considerable detail with reference to certain preferred embodiments thereof. It should be understood that the description is for illustrative purpose, not for limiting the scope of the present invention. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. Furthermore, those skilled in this art can readily conceive variations and modifications within the spirit of the present invention. As another example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. The spirit of the present invention should cover all such and other modifications and variations, which should be interpreted to fall within the scope of the following claims and their equivalents.

What is claimed is:

1. A pixel circuit of an electroluminescence display, comprising:

a level shift transistor coupled between a corresponding light-emitting device and a level shift terminal, configured to limit an operation voltage drop between the level shift terminal and a first voltage line based on an enabling light-emitting signal, ensuring that the operation voltage drop does not exceed a clamping level;

a bias transistor, configured to operate based on a bias signal to provide a luminance current; and a display transistor, connected in series with the bias transistor between the level shift terminal and the first voltage line, configured to opera based on a display signal to modulate the luminance current to a display current providing to the corresponding light-emitting device;

wherein the light-emitting device is coupled between the level shift transistor and a second voltage line, and the first voltage line is different from the second voltage line.

2. The pixel circuit of an electroluminescence display of claim 1, wherein the level shift transistor, the display transistor, and the bias transistor are coupled in a common-cathode structure, and the level shift transistor, the display transistor, and the bias transistor are all P-type metal oxide semiconductor (PMOS) devices.

3. The pixel circuit of an electroluminescence display of claim 1, wherein the level shift transistor, the display transistor, and the bias transistor are coupled in a common-anode structure, and the level shift transistor, the display transistor, and the bias transistor are all N-type metal oxide semiconductor (NMOS) devices.

4. The pixel circuit of an electroluminescence display of claim 1, wherein withstand voltages of the display transistor and the bias transistor both exceed the clamping level.

5. The pixel circuit of an electroluminescence display of claim 1, wherein the display signal includes a pulse width modulation (PWM) signal with a duty cycle, the PWM signal switches the corresponding display transistor to generate the display current and thereby determine a grayscale of the corresponding light-emitting device.

6. The pixel circuit of an electroluminescence display of claim 1, wherein the display transistor is connected in series between the bias transistor and the level shift transistor.

7. The pixel circuit of an electroluminescence display of claim 1, wherein the bias transistor is connected in series between the display transistor and the level shift transistor.

8. The pixel circuit of a electroluminescence display of claim 1, wherein a withstand voltage of the level shift transistor exceeds a series voltage drop between the first voltage line and the second voltage line, and the series voltage drop exceeds withstand voltages of the bias transistor and the display transistor.

9. The pixel circuit of an electroluminescence display of claim 1, further comprising a gate capacitor, configured to be charged/discharged with the luminance current during a refresh period to maintain the level of the bias signal, and coupled to the bras transistor during a display period to provide the luminance current by maintaining a voltage difference between a transconductance control terminal of the bias transistor and the first voltage line.

10. The pixel circuit of an electroluminescence display of claim 9, further comprising:

a refresh switch, configured to operate based on a refresh signal to provide the luminance current during the refresh period; and an auxiliary switch, configured to connect a transimpedance output terminal of the bias transistor to a transimpedance control terminal during the refresh period, arranged in a diode connection parallel to the gate capacitor between the first voltage line and a current I/O terminal to charge/discharge the capacitor and maintain the level of the bias signal.

11. The pixel circuit of an electroluminescence display of claim 10, wherein the auxiliary switch is turned off after the refresh period ends, and the refresh period and the display period do not overlap, wherein during the display period, the pixel circuit supplies the display current to the corresponding light-emitting device.

12. The pixel circuit of an electroluminescence display of claim 11, wherein the bias transistor includes a transimpedance transistor and a transconductance transistor, and the transimpedance transistor and the transconductance transistor do not share a same transistor;

wherein the auxiliary switch connects the transimpedance output terminal and the transimpedance control terminal of the transimpedance transistor during the refresh period, arranged in a diode connection parallel to the gate capacitor between the first voltage line and the current I/O terminal to charge/discharge the gate capacitor and maintain the level of the bias signal;

wherein the auxiliary switch is turned off during the display period, and the gate capacitor is coupled between the first voltage line and the transconductance control terminal of the transconductance transistor to provide the luminance current based on one voltage difference between the transconductance control terminal of the transconductance transistor and the first voltage line.

13. The pixel circuit of an electroluminescence display of claim 12, wherein the refresh period and the display period may optionally have an overlap period or may not overlap.

14. The pixel circuit of an electroluminescence display of claim 12, wherein the transimpedance transistor, the auxiliary switch, and the transconductance transistor form a current mirror circuit, and during the refresh period, the luminance current is mirrored and converted to the luminance current.

* * * * *